United States Patent [19]
Hoch et al.

[11] 4,237,680
[45] Dec. 9, 1980

[54] LATERAL FLOAT LOOKOUT DEVICE

[75] Inventors: Manfried L. Hoch, Romeoville; George B. Cicci, Burr Ridge, both of Ill.

[73] Assignee: International Harvester Company, Chicago, Ill.

[21] Appl. No.: 107,463

[22] Filed: Dec. 26, 1979

Related U.S. Application Data

[63] Continuation of Ser. No. 914,318, Jun. 12, 1978, abandoned.

[51] Int. Cl.³ .............................................. A01D 47/00
[52] U.S. Cl. ........................................ 56/15.9; 56/208
[58] Field of Search ................. 56/208, 15.9, DIG. 1, 56/192, 14.3, 14.4, 14.5

[56] References Cited
U.S. PATENT DOCUMENTS

| | | | |
|---|---|---|---|
| 3,574,990 | 4/1971 | Calder | 56/2 08 |
| 3,656,284 | 4/1972 | Meek et al. | 56/DIG. 1 |
| 3,727,385 | 4/1973 | Twidale et al. | 56/208 |
| 3,958,399 | 5/1976 | Schoeneberger | 56/208 |

OTHER PUBLICATIONS

International Harvester Co. of Canada, Limited, International 4000, 5000 and 5500 Windrowers, 10/1976.

*Primary Examiner*—Jay N. Eskovitz
*Attorney, Agent, or Firm*—Dennis K. Sullivan; Neal C. Johnson; F. David AuBuchon

[57] ABSTRACT

A mower conditioner which is attached to its mobile carrying frame by an upper link and two laterally spaced lower swing links, is provided with a lateral floatation lockout device in the form of a torque transmitting bar selectively rigidly attached at each end to the lower swing links coaxially with the pivotal connection of the latter to the laterally elongated crop harvesting header.

5 Claims, 7 Drawing Figures

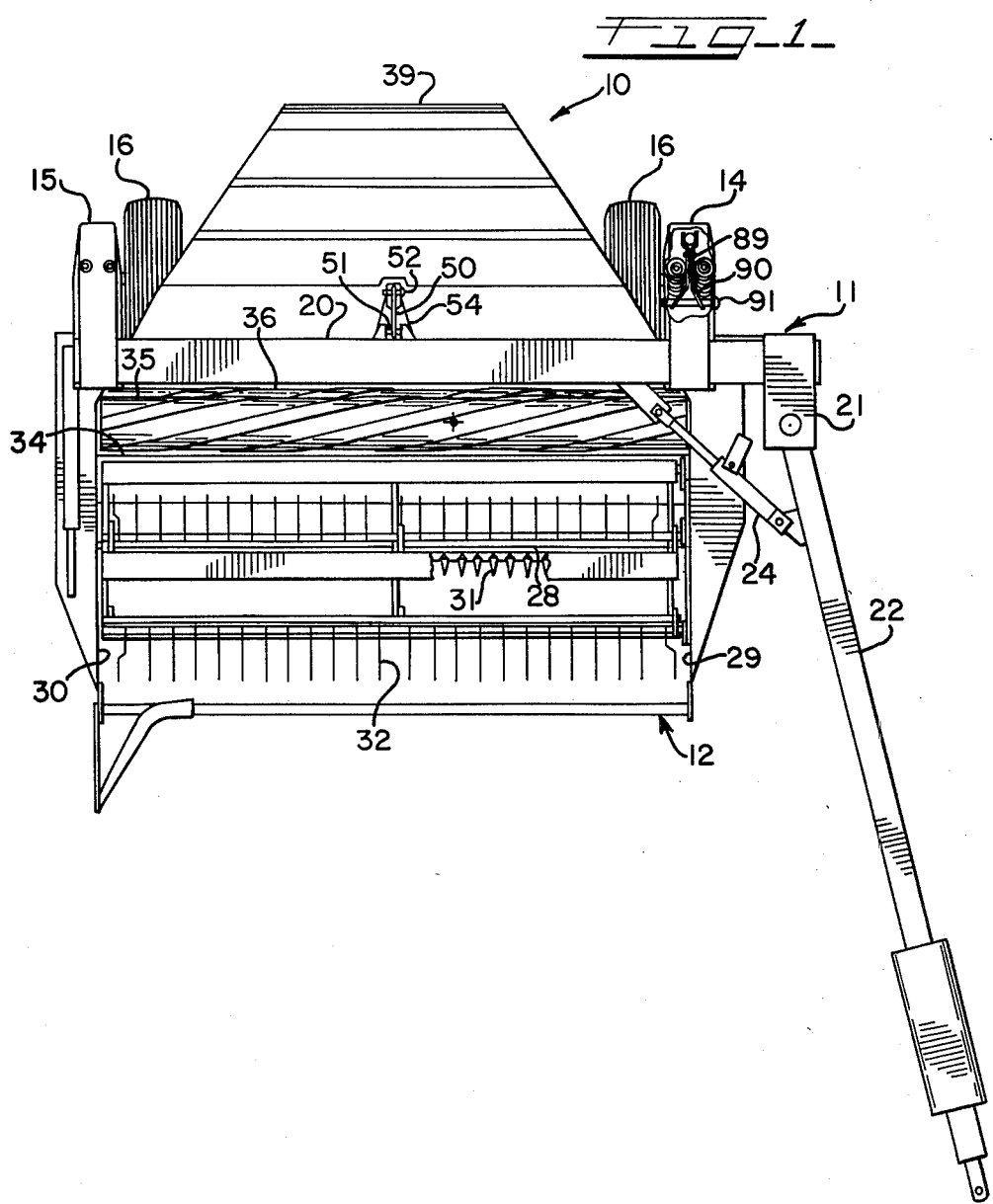

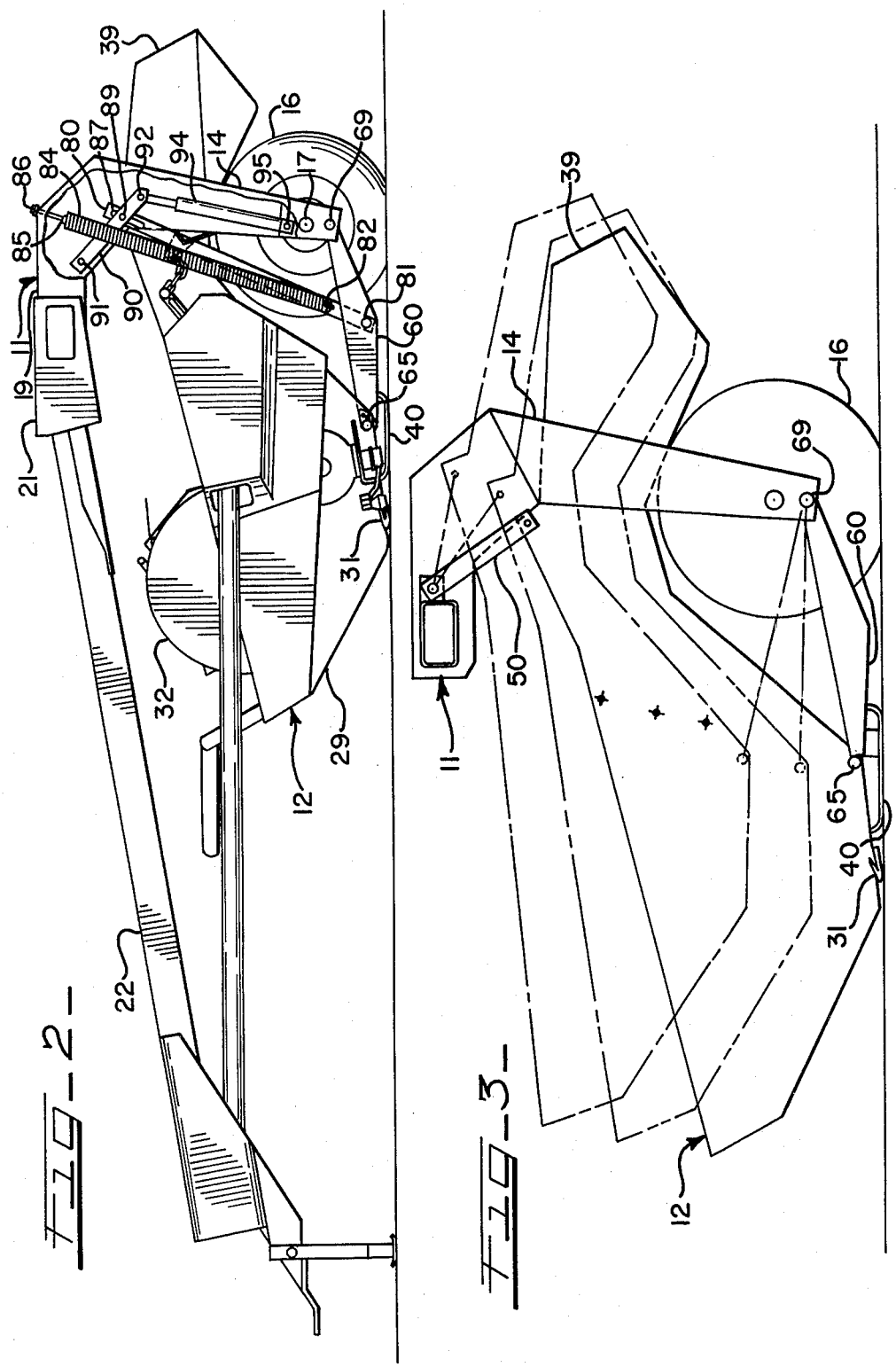

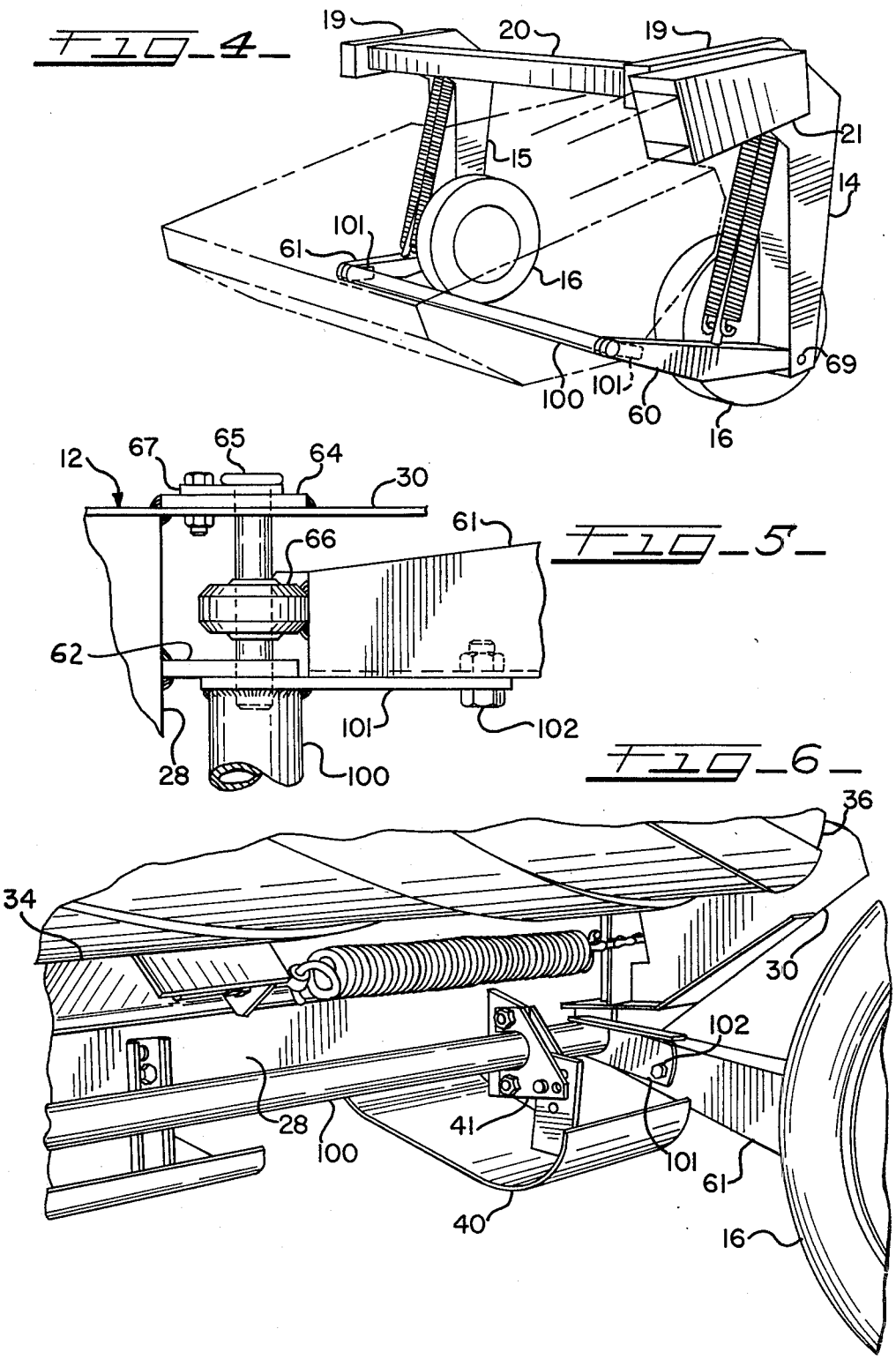

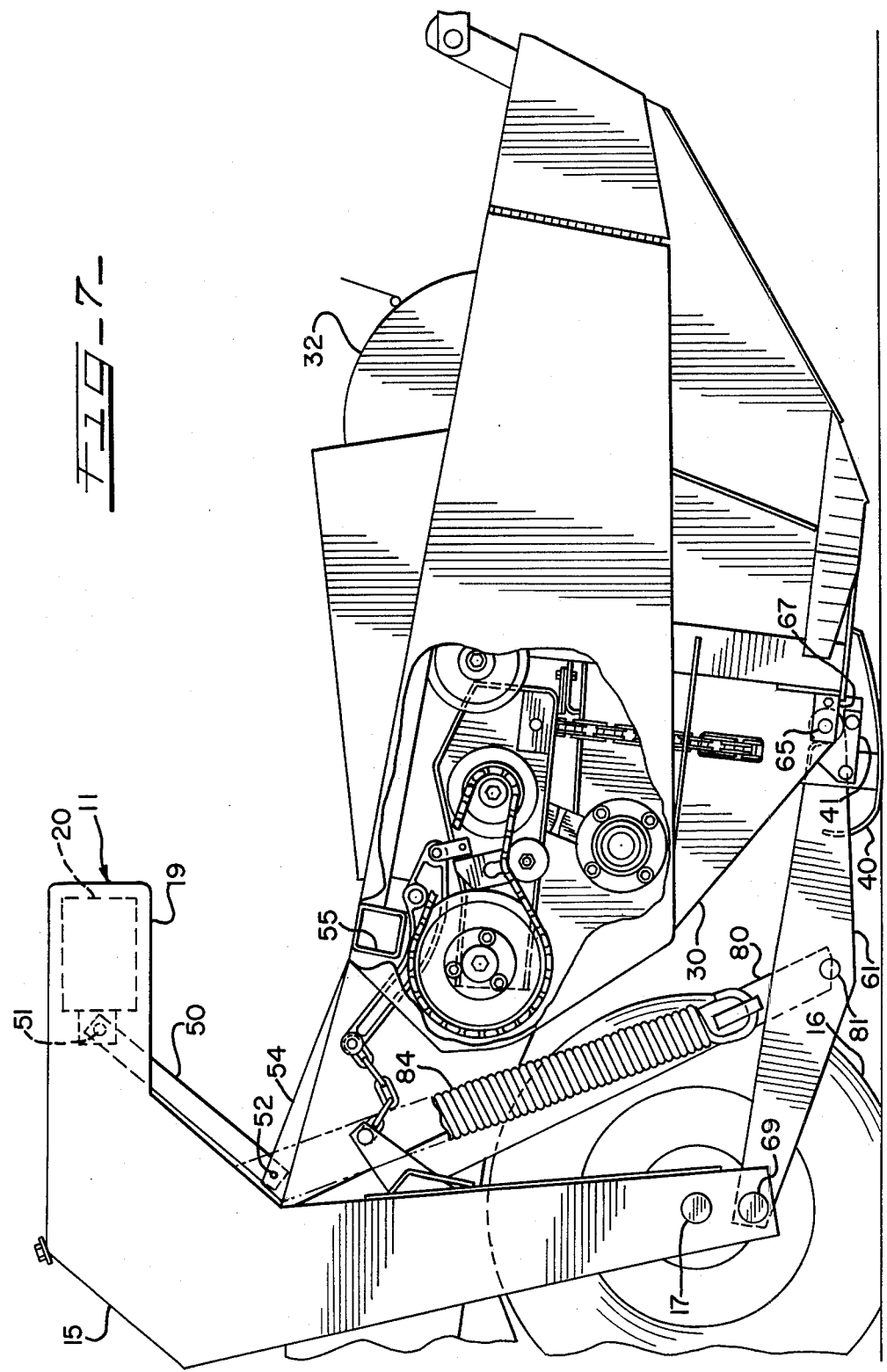

LATERAL FLOAT LOOKOUT DEVICE

This is a continuation of application Ser. No. 914,318, filed June 12, 1978, and now abandoned.

BACKGROUND OF THE INVENTION

This invention relates to hay and grain harvesting machines, such as mower-conditioners and windrowers, of the type having a laterally elongated crop cutting header mounted by linkage to a mobile carrying frame and, more particularly, to an improved device for converting the normal lateral floatation mode of header suspension into a vertical floatation mode of suspension.

In machines of this type, the header is provided with gaging shoes which carry a portion of the weight of the header and gage the height of the cutting apparatus from the ground. It is generally considered preferable to have a suspension system providing lateral or radial floatation wherein the header is not constrained to remain parallel to the axes of the wheels on the carrying frame. Thus, if one side of the header is raised a limited extent, as by a gage shoe encountering an irregularity of obstruction, the other side of the header and its gage shoe will remain on the ground. However, there are conditions wherein lateral floatation is undesirable, such as in cutting grain, wherein the header is in a partially raised position off its gage shoes, and in sidehill operation, wherein the increased loading of the downhill gage shoe and the reduced loading of the uphill shoe can cause irregular stubble height control or shingling. These conditions require a means of locking out the lateral floatation and providing a more nearly vertical floatation wherein the header remains substantially parallel to the carrying frame wheel axes, that is, raise one side of the header and the other side is also raised.

Others have provided a radial floatation lockout device in a windrower wherein each of the lower suspension links is connected in a sort of four bar linkage to the respective end of a torque transmitting member mounted on the windrower chassis. The suspension links are thereby constrained to follow each other. Although this device performs its function, it requires several parts which, in addition to the added expense, increases the possibility of breakage or wearing out.

SUMMARY OF THE INVENTION

Accordingly, it is an object of the invention described and claimed herein to provide an improved lateral float lockout means for a crop harvesting machine wherein the structure is considerably simplified by transmitting the torque from one suspension link to the other along the axis of rotation of the suspension links.

This and other objects of the invention are specifically met in a mobile crop harvester having a wheel supported frame, a laterally elongated crop harvesting header including crop cutting apparatus disposed adjacent the forward edge thereof and ground engaging shoes limiting the downward travel of the header, a suspension linkage for attaching the header to the frame to permit relative vertical movements therebetween including a pair of laterally spaced lower links having forward coaxial pivotal connections respectively with the header and rearward coaxial pivot connections with the carrying frame and a laterally extending torque transmitting bar detachably rigidly attached at each end to a respective lower link coaxially with said pivot connections and extending therebetween. In addition to its simplicity, the torque transmitting bar also provides the advantage of being located immediately behind the cutterbar of the header where it will not interfere with the flow of crops and also of being engaged or disengaged with a single fastener without installing or removing any parts of the mechanism.

DESCRIPTION OF THE DRAWINGS

Other objects and advantages of the invention will become apparent upon reading the detailed description of the invention and upon reference to the drawings, in which:

FIG. 1 is a plan view of a mower-conditioner incorporating the invention described and claimed herein;

FIG. 2 is a left side view of the mower-conditioner of FIG. 1;

FIG. 3 is a schematic left side view of the motion of the header of the mower-conditioner of FIG. 1 relative to the carrying frame;

FIG. 4 is a schematic illustration of the carrying frame and lower suspension linkage of the mower conditioner of FIG. 1, the header being illustrated in phantom lines;

FIG. 5 is a detailed plan view partly in section of the intersection of the torque transmitting bar of FIG. 4 with the right lower suspension link;

FIG. 6 is a pictorial view of the lower right rear portion of the mower-conditioner of FIG. 1 illustrating the connection of the torque transmitting bar to the right lower suspension link; and FIG. 7 is a right side view of the mower-conditioner of FIG. 1 with a portion of the side cover removed to illustrate the conditioning roll mounting.

DETAILED DESCRIPTION OF THE PREFERRED EMBODIMENT

As used in the following description, the terms "left", "right", "forward", and "rearward", are to be taken as being viewed by a person standing at the rear of the harvester looking forward and should not be construed to limit the invention except as specifically noted.

Turning to the drawings, there is shown a mower-conditioner designated 10 which generally comprises a mobile carrying frame assembly 11 and a laterally elongated crop harvesting header assembly 12 mounted thereto by a linkage permitting the header 12 to move generally vertically relative to the frame assembly 11. The mobile carrying frame assembly 11 comprises left and right vertical frame members 14 and 15 having ground wheels 16 rotatably mounted on spindles 17 welded on the respective inner sides thereof adjacent the bottom. The vertical frame members 14 and 15 are of inverted L-shape and extend upwardly slightly to the rear to a forwardly extending upper leg portion 19 and are hollow to receive a portion of the lifting and floatation mechanism. As best seen in FIGS. 1 and 4, a horizontal main beam 20 is welded to and extends laterally between the forwardly extending upper leg portions 19 of the vertical frame members 14 and 15, thus forming an integral carrying frame structure. The horizontal main beam 20 extends leftward of the left vertical member 14 to a forwardly extending socket-like member 21 welded thereto to which the rear end of a tractor hitch tongue 22 is pivotally attached for lateral swinging. The tongue position is controlled by a hitch lock mechanism 24 of selectively variable length interconnecting the horizontal main beam 20 and the tongue 22 to control the relative position of the mower conditioner 10 behind a pulling tractor (not shown) which additionally provides mechanical and hydraulic power for operating the various mechanisms of the mower conditioner 10 in any known manner.

The crop harvesting header 12 is a conventional header used in hay harvesting machines, for example of the general type illustrated in Bornzin et al. U.S. Pat. No. 3,633,345, comprising a laterally elongated cutterbar 28 which forms a main lateral frame member interconnecting the side sheet 29 and 30 of the header 12 and has a sickle bar type cutting apparatus 31 disposed laterally across the forward edge thereof. A conventional rotary reel 32 is rotatably mounted between side sheets 29 and 30 above the cutting apparatus 31 for removing crops therefrom and sweeping them rearwardly and upwardly along a platform sheet 34 attached to the rear of the cutterbar 28 and curved upwardly to follow the reel periphery, the crops being delivered into the nip of a pair of conventional laterally elongated upper and lower crop conditioning rolls 35 and 36 rotatably mounted between the side sheets 29 and 30 of the header 12. The crops are ejected from the conditioning rolls 35 and 36 in a rearward and upwardly directed stream into a windrow forming hood 39 wherein the crops are laterally consolidated and deposited on the ground in a windrow. The header 12 is further provided with means for regulating the minimum height of the cutting apparatus 31 from the ground in the form of a pair of ground engaging gage shoes 40 disposed respectively adjacent the left and right ends of the cutter-bar 28, being mounted thereto in conventional fashion by having their forward portions hooked into the bottom side of the cutterbar 28 and having their rearward portions adjustably secured to brackets 41 mounted on the rear of the cutterbar, as shown in FIG. 6.

The header 12 is mounted in underslung fashion beneath the horizontal main beam 20 of the carrying frame 11 by means of a linkage permitting a range of generally vertical movements of the header relative to the frame, such as shown in FIG. 3. To this end, as shown in FIGS. 1 and 7, an upper link 50 is pivotally attached to a pin 51 mounted by brackets to the rearward side of the horizontal main beam 20 centrally between the vertical frame members 14 and 15. The upper link 50 extends downwardly rearwardly to a pivotal mounting with a pin 52 mounted on a bracket 54 attached to the upper side of the header 12 at the lateral center of the windrow hood 39 immediately behind an upper transverse beam 55 which also interconnects the side sheets 29 and 30. The lower rearward portion of the header 12 is linked to the lower portion of the vertical legs 14 and 15 respectively of the carrying frame 11 by left and right lower swing links 60 and 61. FIG. 5 illustrates the mounting of the right lower swing link 61 to the header 12. The mounting of the left lower swing link 60 to the header 12 is a mirror image of this mounting. A bracket 62 is welded to and extends rearwardly from the rear of the cutterbar 28 parallel to the right side wall 30, the latter being thickened by the addition of a welded plate 64 to provide additional strength. A pin 65 is inserted through slightly larger apertures in the side wall 30, a bearing 66 attached to the forward end of the right lower link 61 and the bracket 62. A locking plate 67 is welded to the pin 65 adjacent its head and extends radially therefrom and is bolted to the side sheet 30 thereby retaining the pin 65 in place. Thus the front end of the lower links 60 and 61 are pivotally attached to the rear end of the header, the pivot axes, i.e., the pins 65, of the lower links being coaxial. The rearward ends of the left and right lower links 60 and 61 are pivotally connected as by pivot pins 69 respectively to the lower ends of the vertical frame members 14 and 15, the axes of the pivot pins 69 also being coaxial.

Lifting and floatation means are provided for raising and lowering the header 12 relative to the carrying frame and for counterbalancing a large portion of the weight of the header 12 to allow it to follow the ground in a more responsive fashion. To this end, a lifting strap 80 is pivotally connected as by pin 81 to the lower link 60 midway between its ends, the strap 80 extending upwardly therefrom to a spring anchor 82 attached thereto as by welding and extending laterally outwardly on either side thereof. The lower ends of a pair of floatation tension springs 84 are hooked on the respective spring anchors 82 and extend upwardly inside the frame member 14 to end retaining collars 85 which are threaded on adjusting screws 86 extending through the vertical frame members 14. Thus, by turning the screws 86, a proper amount of tension may be placed on the floatation springs 84. The lifting strap 80 extends beyond the floatation spring anchors 82 to a slotted upper end inside the vertical frame member 14. The slot 87 in the upper end of the lifting strap 80 is engaged by a pin 89 on a lifting lever 90 pivotally connected to the frame member 14 as by transverse pin 91. The lifting lever 90 extends radially outwardly from the pin 91 with a lifting strap 80 to a pivotal connection as by pin 92 with the rod end of a hydraulic cylinder 94 pivotally anchored as at 95 to a gusset within the vertical frame member 14. It will be understood that a similar lift and float mechanism is attached to the right swing link 61 and extends into the right vertical frame member 15. Thus, when the header 12 is in operating position with its ground shoe 40 engaging the ground, the floatation springs 84 acting on the lower swing links 60 and 61 through the short portion of the lifting strap 80 counterbalance the header 12 while the lost motion connections between the slot 87 and the lifting lever 90 prevents the hydraulic cylinders 94 from being pumped during floatation during normal operation. Extending the hydraulic cylinder 94 takes up the lost motion connection and acting on the lower swing links through the lifting strap 80, raises the header to the transport position, the uppermost position illustrated in FIG. 3.

As thus far described, there is no connection, other than the header 12, between the left and right lower swing links 60 and 61. Thus, it can be seen from the schematic diagram of FIG. 4 (forgetting for the moment the torque transmitting bar 100) that, due to the pivotal connections existing between the lower swing links and the header and carrying frame, lateral floatation is present, that is, the forward end of the link 61 could be raised without raising the forward end of the left link 60. Such is the normal operating condition of the harvester 10. However, in accordance with the invention claimed herein, a lateral floation lockout device has been added in the form of a torque transmitting bar 100 which extends along the pivot axis formed by the forward pivot pins 65 between the left and right lower swing links 60 and 61. As viewed in FIG. 5, it will be seen that the torque transmitting bar 100 is hollow and has a radially extending plate 101 welded to the end thereof, the plate having an aperture receiving the end of the pivot pin 65 which maintains the end of the torque transmitting tube 100 in alignment with the pivot axis. The plate 101 is attached to the right lower link 61 as by bolt 102 to form a torsionally rigid connection between the bar 100 and the link 61. The torque transmitting bar 100 extends through, but is not bound by, the ground shoe attaching bracket 41 to the left side of the header 12 whereat it is attached to the left lower swing link 60 in the same manner. It is important in order to fulfill its function that the torque transmitting bar 100 be rotatable relative to the header 12 in order to fulfill its function.

In operation, it can be seen that any tendency for one of the lower swing links 60, 61 to move angularly with respect to the other lower swing link, as would be the case in a lateral floatation suspension, will produce a moment in the torque transmitting bar 100 which when transmitted to the other link will tend to move the other swing link in the same direction as the first in order to reduce the angular deflection in the torque transmitting bar. Accordingly, lifting one side of the header will cause the other side to be raised to maintain the header parallel to the wheel axes. If an absolutely stiff torque transmitting bar is utilized, the result will be a vertical floatation suspension system. Although it is believed that a relatively stiff torque transmitting bar is desirable, especially in operation such as harvesting grain with the gage shoes 40 off the ground, some torsional flexibility in the bar 100 is desirable particularly for side hill operation to dampen out the transmission of shock loads imposed from one side of the header to the other side of the header. Torsional flexibility thus produces a hybrid lateral-vertical floatation mode. It will be noted of course that the machine may be converted to a full lateral floatation suspension mode merely by removing one of the bolts 102 interconnecting the torque transfer bar plate 101 and the lower links 60 or 61. The bar 100 does not need to be removed in this condition since it is retained in place by pin 65 passing through plate 101, the brackets 41 and its connection to the other lower link.

Thus, it is apparent that there has been disclosed, in accordance with the invention, a lateral float lockout device that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace such alternatives, modifications and variations as fall within the spirit and scope of the appended claims.

What is claimed is:

1. In a mobile crop harvester,
   a mobile frame supported by a pair of laterally spaced wheels;
   a laterally elongated crop harvesting header including crop cutting apparatus disposed adjacent the forward edge thereof and ground-engaging means for limiting the downward travel of said cutting apparatus;
   linkage for attaching said header to said frame, said linkage including an upper link and a pair of laterally spaced lower swing links having forward ends substantially coaxially pivotally connected respectively with said header at laterally spaced locations thereon and rearward ends having pivotal connections respectively with said frame means; and
   a laterally extending torque transmitting bar rigidly attached at each end to said lower links respectively and extending rotationally unrestrained therebetween coaxially with said coaxial pivotal connection.

2. The invention in accordance with claim 1 and one of said pivotal connections including a pivot pin, said torque transmitting bar having a hollow end piloted on said pin.

3. The invention in accordance with claim 1 and a plate fixedly attached to one end of said torque transmitting bar and means for easily detachably securing said plate to the adjacent lower link at a point radially displaced from said pivotal connection.

4. In a mobile hay harvesting machine,
   a wheel supported frame;
   a laterally elongated crop harvesting header including a crop cutting apparatus disposed adjacent the forward edge thereof, ground-engaging means for limiting the downward travel of said cutting apparatus, and crop conditioning means disposed rearwardly above said cutting apparatus for receiving cut crop therefrom and discharging said crops in a rearward stream for deposit on the ground;
   linkage for attaching said header to said frame, said linkage including an upper link and a pair of laterally spaced lower swing links, each link having a first end pivotally connected to said header and a second end pivotally connected to said frame; and
   a laterally extending torque transmitting member attached at each end to said lower links respectively and extending therebetween, said member being positioned sufficiently near said header to prevent interference with said rearward stream of crops in the operating positions of said header.

5. The invention in accordance with claim 4 and said torque transmitting member being coaxial with the pivotal connections of said lower links to said header.

* * * * *